UNITED STATES PATENT OFFICE.

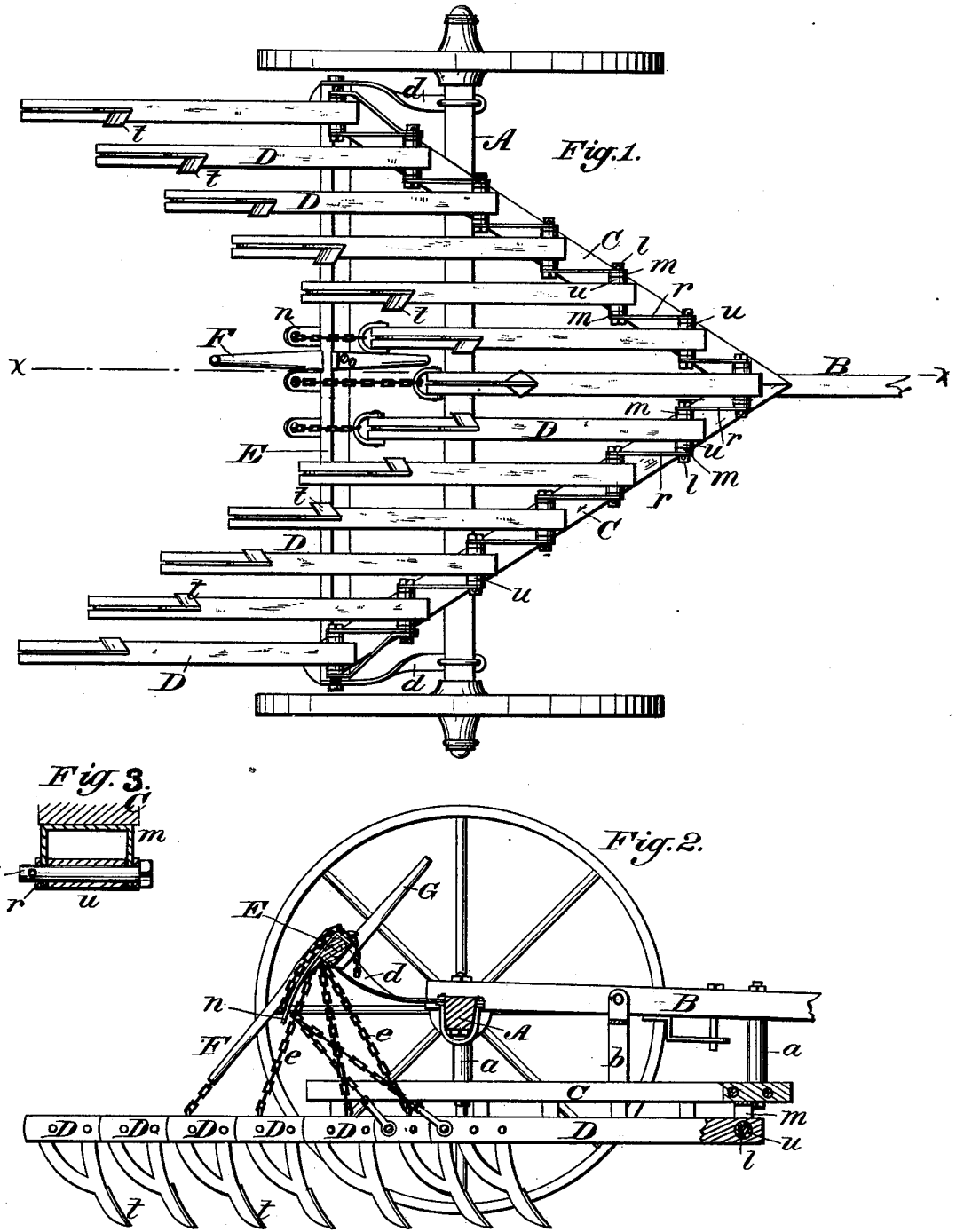

HENRY BLOEDEL, OF FOND DU LAC, WISCONSIN.

IMPROVEMENT IN CULTIVATORS.

Specification forming part of Letters Patent No. 222,446, dated December 9, 1879; application filed August 15, 1879.

*To all whom it may concern:*

Be it known that I, HENRY BLOEDEL, of Fond du Lac, in the county of Fond du Lac and State of Wisconsin, have invented certain Improvements in Cultivators, of which the following is a specification.

My invention relates to that class of cultivators which are used primarily for cultivating or working up land that has been plowed preparatory to sowing spring wheat or any similar crop, and which may also be so adjusted as to be used for cultivating corn and similar growing crops; and the invention consists in the novel construction and arrangements of the parts, as hereinafter more fully set forth.

Figure 1 is a plan view of the implement, turned bottom-side up for the purpose of more clearly showing the construction; and Fig. 2 is a longitudinal vertical section taken on the line $x\,x$ of Fig. 1, the instrument standing in its natural position ready for use; and Fig. 3 is a sectional view of the device used for hinging the beams to the frame.

It is customary, in those parts of the country where spring wheat is raised, to plow the land in the fall, and then to sow the grain in the spring, and it is often, if not generally, desirable to prepare the surface anew in the spring before sowing the grain, especially where the stubble, weeds, &c., were not fully covered or turned under by the previous fall-plowing, and also where the ground is lumpy or otherwise in bad condition, the object being to furnish a thoroughly-pulverized bed in which to deposit the seed, and to have it as free from weeds, &c., as possible; and the object of my present invention is to produce an implement specially adapted to this purpose, and which, by a slight adjustment of some of its parts, can also be used for cultivating corn and other growing crops, and thus save the necessity and expense of keeping an additional cultivator for this latter purpose.

To accomplish these objects I construct my improved cultivator as represented in the accompanying drawings, in which—

A represents an axle mounted on two wheels, with a tongue, B, secured centrally thereto. I then provide a V-shaped frame, C, consisting of the two bars firmly united at their front end, which frame is rigidly suspended underneath the axle and tongue by means of three vertical bars, $a$, through which extend bolts, as shown in Fig. 2, two of these being connected to the axle, and the other to the tongue, as shown. Two or more braces, $b$, are also arranged to extend from the tongue B down to the frame C, one on each side, and assist to hold the frame rigidly in connection with the parts above, and prevent lateral displacement of the frame. I then provide a series of beams or drag-bars, D, thirteen in number, but using more or less, according to the size of the implement. These bars D are each provided with a cultivator-share, $t$, attached at or near their rear ends, as represented in the drawings. These shares may be of any suitable style or make, but, preferably, will be somewhat in the form of a plow, so as to throw the soil to one side or turn it over as they are drawn along.

The beams D are each hinged at their front ends to the under side of the frame C, in the manner shown in Fig. 1, and in detail in Fig. 3. Transversely through the front end of each bar I insert a tube, $u$, and through this pass a bolt, $l$, the ends of which pass through holes in the ends of a metal support, which is twice bent at right angles, so as to form two pendent arms, $m$, as shown in Fig. 3, these supports or pendants being securely bolted to the under side of the frame C at regular intervals from front to rear, as shown in Fig. 1.

I also provide a series of iron straps, $r$, long enough to reach from one of the pendants to the next, and attach the front end of each to the outer end of the hinge-bolt $l$, and its rear end to the inner end of the next bolt $l$ in rear, as shown in Fig. 1, each strap thus serving to unite two of the pendants, so that the entire series on each side shall be thus united and braced or tied together.

In rear of the axle I mount a transverse shaft, E, supported at its ends by journals resting in bearings in the rear ends of two arms, $d$, which are rigidly secured to and project back from the axle A, as shown.

From each drag-bar D a chain, $e$, extends up, and is attached to this shaft E, so that by turning the shaft all of the drag-bars with their shares may be raised from the ground simultaneously, the shaft E being provided with a lever or handle, F, for raising the shares, and another lever or arm, G, projecting in the opposite direction, and so arranged that when the shares are raised the front end of this arm G will rest upon the axle alongside of the rear end of the tongue, where it may be held by a button, catch, or any suitable means.

As the central bars are so much in advance of those at the sides, it becomes necessary to attach the lifting-chains to them at a point much farther from the joint on which they move, and consequently these central bars would not be raised as high as the others by merely winding their chains around the shaft; and to remedy or obviate this difficulty I attach to the rear side of the shaft E a series of arms, $n$, as shown in Fig. 2, these arms extending downward and having the chains of the central bars D attached to their projecting ends, or, what is the same, pass through a hole in their ends, and extend from thence up to the shaft to which they are secured.

It will be seen that the result of this arrangement is, that as the shaft is rotated these arms $n$ act as eccentrics, taking up much more of the chain than would be done if it were attached direct to the shaft without the interposition of the arm $n$, and that thus these central bars will be raised equally with the others.

It will, of course, be understood that if it be desired to raise each bar equally, then each of the arms $n$ will be made of a length proportioned to the distance from the joint at which the chain is attached to the bar.

In practice, however, I find it necessary to provide arms only for the three central bars, and in that case they may be very nearly of uniform length.

An implement constructed on this plan is admirably adapted to working plowed land, as above described, at any season of the year and for all kinds of crops.

When it is desired to use it for cultivating corn or other crops growing in rows, it is only necessary to detach such of the bars as would disturb the row of plants, leaving as many as may be required to cultivate the ground on opposite sides of the row, and thus it can be made to answer the purpose of an ordinary cultivator.

The advantages of an implement that can thus be adapted to these several uses on the farm will be apparent to those familiar with agricultural pursuits.

I am aware that the drag-bars of grain-drills have been hinged to their frames, and that drag-bars have been arranged in V form, and also that a V-shaped frame has before been used, and therefore I do not claim either of these features, separately considered; but, Having fully described my invention, what I claim is—

1. The combination, in a cultivator, of the axle mounted on wheels and provided with a rigid tongue, with the V-shaped frame having the series of beams D independently hinged thereto, said frame, with its hinged beams, being rigidly suspended underneath the axle, and all being arranged to operate substantially as shown and described.

2. In combination with the series of independently-hinged bars D, arranged in V form, as shown, the rotating shaft E, provided at its center with the arms $n$, for raising the central beams equally with the remaining beams which are connected direct to said shaft, as set forth.

3. In combination with the pendants $m$, having the bars D hinged thereto, as described, the connecting bars or braces $r$, arranged in the manner shown and described.

HENRY BLOEDEL.

Witnesses:
HENRY WALLICHS,
PH. STAMM, Jr.